(12) United States Patent
Tolentino et al.

(10) Patent No.: US 11,258,248 B2
(45) Date of Patent: Feb. 22, 2022

(54) INPUT OVERVOLTAGE PROTECTION CIRCUITS FOR POWER SUPPLIES

(71) Applicant: Astec International Limited, Kowloon (HK)

(72) Inventors: Ruel Joyosa Tolentino, Sampaloc Manila (PH); Jahres Rederi Masangkay Satur, Valenzuela (PH); Khanderao Madhav Gaikwad, Metro Manila (PH)

(*) Notice: Subject to any disclaimer, the term of this patent is extended or adjusted under 35 U.S.C. 154(b) by 220 days.

(21) Appl. No.: 16/737,403

(22) Filed: Jan. 8, 2020

(65) Prior Publication Data

US 2021/0210949 A1     Jul. 8, 2021

(51) Int. Cl.
*H02H 7/125*  (2006.01)
*H02M 1/42*  (2007.01)
*H02M 1/36*  (2007.01)
*H02M 1/32*  (2007.01)

(52) U.S. Cl.
CPC ........ *H02H 7/1252* (2013.01); *H02M 1/4208* (2013.01); *H02M 1/4225* (2013.01); *H02M 1/32* (2013.01); *H02M 1/36* (2013.01)

(58) Field of Classification Search
CPC ........... H02H 7/10; H02H 7/12; H02H 7/125; H02H 7/1252; H02M 1/42; H02M 1/4208; H02M 1/4225; H02M 1/36; H02M 1/32; H02M 7/12; H02M 7/125; H02M 7/155; H02M 7/1555
See application file for complete search history.

(56) References Cited

U.S. PATENT DOCUMENTS 6,473,284 B1 * 10/2002 Ilic ................... H02M 1/32 361/18
7,848,074 B2   12/2010 Stiedl
9,343,951 B2 *  5/2016 Du .................... H02M 1/32
(Continued)

FOREIGN PATENT DOCUMENTS

EP          3514907 A1    7/2019

OTHER PUBLICATIONS

Subramaniam, Palanivel; "Flexible input relay architecture fora converter to operate from disparate power sources"; IEEE; 2014 IEEE 36th International Telecommunications Energy Conference (INTELEC); Dec. 4, 2014; pp. 1-5 of Attached Document (Year: 2014).*

*Primary Examiner* — Thienvu V Tran
*Assistant Examiner* — Shahzeb K Ahmad (57) ABSTRACT

A power supply includes a power converter, a protection circuit, and a control circuit. The protection circuit includes an input for receiving an input voltage, an output for providing an output voltage to the power converter, a first switching device coupled in a current path between the input and the output, and a second switching device coupled across the first switching device. The control circuit is configured to sense the input voltage and the output voltage, in response to the output voltage exceeding a first defined threshold, turn off the first switching device and turn on the second switching device to supply power to the power converter, and in response to the input voltage exceeding a second defined threshold, turn off the second switching device to disconnect the power source from the power converter. Other example power supplies and protection circuits are also disclosed.

20 Claims, 5 Drawing Sheets

(56) References Cited

U.S. PATENT DOCUMENTS

| | | | |
|---|---|---|---|
| 9,473,028 B1* | 10/2016 | Hoyt | H02H 9/04 |
| 2006/0022648 A1* | 2/2006 | Ben-Yaakov | H02M 1/4225 |
| | | | 323/222 |
| 2009/0152950 A1* | 6/2009 | Zhang | H02M 1/36 |
| | | | 307/43 |
| 2013/0336028 A1* | 12/2013 | Kawamura | H02M 1/4233 |
| | | | 363/53 |
| 2021/0211056 A1* | 7/2021 | Moriyama | H02M 1/4258 |

* cited by examiner

INPUT OVERVOLTAGE PROTECTION CIRCUITS FOR POWER SUPPLIES

FIELD

The present disclosure relates to input overvoltage protection circuits for power supplies.

BACKGROUND

This section provides background information related to the present disclosure which is not necessarily prior art.

Electrical power supplies include power circuits receiving power from input power sources. Sometimes, the power supplies include circuitry coupled between the power sources and the power circuits for providing input overvoltage and/or inrush current protection. For example, the power supplies may include one or more electromechanical switching devices coupled between the power sources and the power circuits to disconnect the power circuits during an overvoltage condition. In other examples, resistors may be coupled across the electromechanical switching devices to limit input inrush current from the power sources.

SUMMARY

This section provides a general summary of the disclosure, and is not a comprehensive disclosure of its full scope or all of its features.

According to one aspect of the present disclosure, an electrical power supply includes a power converter, a protection circuit, and a control circuit. The protection circuit includes an input coupled to an electrical power source for receiving an input voltage, an output coupled to the power converter for providing an output voltage to the power converter, a first switching device coupled in a current path between the input and the output, and a second switching device coupled across the first switching device. The first switching device is controllable to turn on during startup of the power converter. The control circuit is in communication with the first switching device and the second switching device. The control circuit is configured to sense the input voltage and the output voltage, in response to the output voltage exceeding a first defined threshold, turn off the first switching device and turn on the second switching device to supply power to the power converter, and in response to the input voltage exceeding a second defined threshold, turn off the second switching device to disconnect the electrical power source from the power converter.

According to another aspect of the present disclosure, a protection circuit for coupling between an electrical power source and a power converter to provide input overvoltage protection for the power converter is disclosed. The protection circuit includes an input configured to couple to an electrical power source for receiving an input voltage, an output configured to couple to the power converter for providing an output voltage to the power converter, a first switching device coupled in a current path between the input and the output, a second switching device coupled across the first switching device, and a control circuit. The first switching device is controllable to turn on during startup of the power converter. The control circuit is in communication with the first switching device and the second switching device. The control circuit is configured to sense the input voltage and the output voltage, in response to the output voltage exceeding a first defined threshold, turn off the first switching device and turn on the second switching device to supply power to the power converter, and in response to the input voltage exceeding a second defined threshold, turn off the second switching device to disconnect the electrical power source from the power converter.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding (but not necessarily identical) parts and/or features throughout the several views of the drawings.

DETAILED DESCRIPTION

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Example embodiments will now be described more fully with reference to the accompanying drawings.

Figure 1:
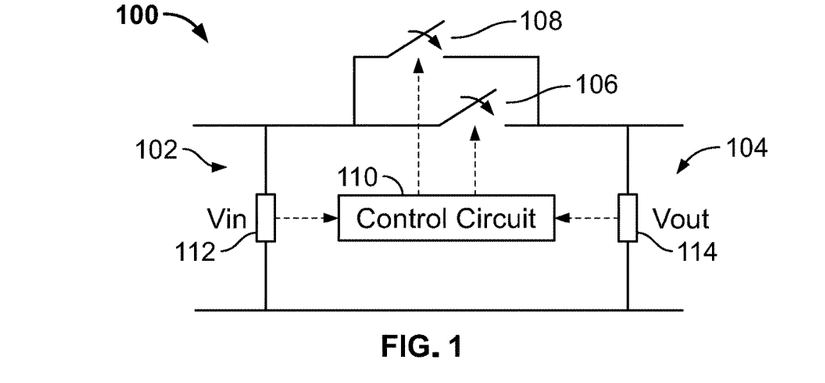
FIG. 1 is a block diagram of a protection circuit including two switching devices for disconnecting a power source from a power converter according to one example embodiment of the present disclosure.

A protection circuit for coupling between an electrical power source and a power converter to provide input overvoltage protection for the power converter according to one example embodiment of the present disclosure is illustrated in FIG. 1 and indicated generally by reference number 100. As shown in FIG. 1, the protection circuit 100 includes an input 102 for coupling to an electrical power source (not shown) to receive an input voltage Vin, an output 104 for coupling to a power converter (not shown) to provide an output voltage Vout to the power converter, two switching devices 106, 108, and a control circuit 110 in communication with the switching devices 106, 108. The switching device 106 is coupled in a current path between the input 102 and the output 104, and controllable to turn on during startup of the power converter. The switching device 108 is coupled across the switching device 106. The control circuit 110 is configured to sense the input voltage Vin and the output voltage Vout, turn off the switching device 106 and turn on the switching device 108 to supply power to the power converter in response to the output voltage Vout exceeding a defined output voltage threshold, and turn off the switching device 108 to disconnect the power source from the power converter in response to the input voltage Vin exceeding a defined input voltage threshold.

As such, by employing the protection circuit 100 and/or any other protection circuit disclosed herein to disconnect the power source from the power converter, overvoltage protection from excessive input voltage is provided for the power converter. This may be particularly useful in applications (e.g., outdoor applications, etc.) requiring excessive overvoltage protection such as at least 150% of the rated input voltage.

As explained above, the switching device 106 is turned on (e.g., closed position) during startup of the power converter. During this time, the switching device 108 is initially turned off (e.g., open position). As a result, current from the input power source may be passed to the power converter via the switching device 106 to, for example, charge an effective capacitance of the power converter. After the effective capacitance is sufficiently charged, the control circuit 110 turns off the switching device 106 and turns on the switching device 108.

The capacitances of the power converter may be sufficiently charged when the output voltage Vout reaches the defined output voltage threshold. For example, and as shown in FIG. 1, the protection circuit includes an output sensor 114 such as a resistive voltage sensor, etc. coupled across the output 104. The control circuit 110 receives a signal from the output sensor 114 representing the output voltage Vout. In response to the control circuit 110 determining the output voltage Vout has reached the defined output voltage threshold, the control circuit 110 may send a control signal to the switching device 106 to open the switching device 106, and a control signal to the switching device 108 to close the switching device 108. At this time, power is supplied from the power source to the power converter via the closed switching device 108.

In such examples, the output voltage defined threshold may be equivalent to a rated peak voltage of the input voltage Vin. As such, if the input voltage Vin is an AC input voltage, the output voltage defined threshold may be equal to the rated peak voltage of the AC input voltage. In such examples, the output voltage defined threshold may be 85V, 120V, 220V, 250V, 275V, 300V, etc.

If the input voltage Vin exceeds the defined input voltage threshold, the switching device 108 is turned off. For example, and as shown in FIG. 1, the protection circuit includes an input sensor 112 such as a resistive voltage sensor, etc. coupled across the input 102. In such examples, the control circuit 110 receives a signal from the sensor 112 representing the input voltage Vin. In response to the control circuit 110 determining the input voltage Vin has reached the defined input voltage threshold, the control circuit 110 may send a control signal to the switching device 108 to open the switching device 108. At this time, the switching device 108 and the switching device 106 are open thereby disconnecting the power converter from the power source providing an excessive input voltage.

The defined input voltage threshold may be any suitable value above the rated peak voltage of the input voltage Vin. For instance, the defined input voltage threshold may be a set value higher than the rated peak voltage of the power source. For example, if the input voltage Vin is an AC input voltage, the input voltage defined threshold may be equal to a voltage at least 120% of the rated peak voltage of the AC input voltage. In such examples, if the rated peak voltage of the AC input voltage is 275V, the input voltage threshold may be set to 330V (e.g., 275V*1.2). In other examples, the input voltage defined threshold may be equal to a voltage at least 150%, at least 173%, etc. of the rated peak voltage of the AC input voltage.

In other examples, the switching device 108 may be turned off when the input voltage Vin exceeds the defined input voltage threshold for a defined period of time. This may be useful when the power converter is able to withstand momentary spikes in the input voltage. In such examples, the defined period of time may be based on the defined input voltage threshold. For example, if the input voltage threshold is set to a high value (e.g., 173% of the rated peak voltage of the input voltage), the defined period of time may be set to a short time period (e.g., 200 milliseconds, etc.). If the input voltage threshold is instead set to a lower value (e.g., 150% of the rated peak voltage of the input voltage), the defined period of time may be set to a longer time period (e.g., 5 seconds, etc.).

Additionally, the switching device 108 may be turned off based on a bulk output voltage across the capacitance. For example, if the rated peak voltage of the AC input voltage is 275V, the bulk output voltage across the capacitance may reach 396V during normal operation. In such examples, the switching device 108 may be turned off if the bulk output voltage exceeds 560V for 1 millisecond, 540V for 50 milliseconds, 500V for 5 seconds, etc.

In some examples, the control circuit 110 may control the switching device 106 to turn on during startup of the power converter. For example, and as explained above, the control circuit 110 may send a control signal to the switching device 106 to close the switching device when the power converter is enabled (e.g., during startup of the power converter, etc.). In other examples, and as further explained below, the switching device 106 may be turned on based on an auxiliary supply, the input voltage, etc.

Figure 2:
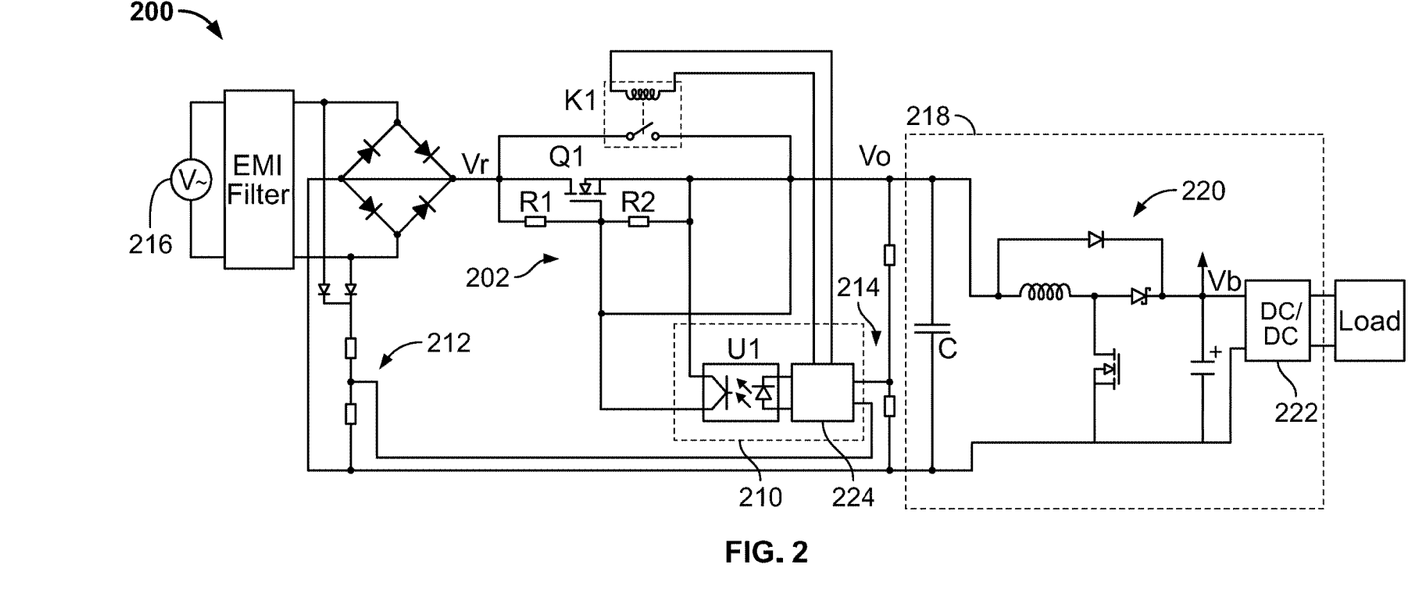
FIG. 2 is a schematic diagram of a power supply including a power source, a power converter, and a protection circuit having a MOSFET, a relay and a control circuit for controlling the MOSFET and the relay to disconnect the power source from the power converter according to another example embodiment.

For example, FIG. 2 illustrates a power supply 200 including a protection circuit 202 having a self-biasing switching device. Specifically, the power supply 200 includes the protection circuit 202 having a self-biasing MOSFET Q1 and a relay K1, a power circuit 218 receiving power from an AC power source 216 via the protection circuit 202, an input voltage sensor 212, an output voltage sensor 214, and a control circuit 210. As shown, the power converter 218 includes an AC/DC power factor correction (PFC) circuit 220 and a DC/DC power conversion circuit 222 coupled between the PFC circuit 220 and a load.

The MOSFET Q1 and the relay K1 of the protection circuit 202 may be similar to the switching devices 106, 108 of FIG. 1. For example, and as shown in FIG. 2, the MOSFET Q1 is coupled in a current path between an input of the protection circuit 202 (e.g., the power source 216) and an output of the protection circuit 202 (e.g., the power converter 218), and the relay K1 is coupled across the MOSFET Q1.

As explained above, the MOSFET Q1 of protection circuit 202 is self-biasing. For example, the MOSFET Q1 of FIG. 2 may be self-biased in response to an input voltage from the power source 216. Specifically, and as shown in FIG. 2, the protection circuit 202 includes a resistor R1 coupled between a drain terminal and a gate terminal of the MOSFET Q1, and a resistor R2 coupled between the gate terminal and a source terminal of the MOSFET Q1. The resistors R1, R2 form a voltage divider circuit. As such, when the power source 216 provides its input voltage to the protection circuit 202, a sufficient voltage is applied to the gate terminal of the MOSFET Q1 via the voltage divider circuit to bias the MOSFET Q1 causing the MOSFET Q1 to turn on.

In the particular example of FIG. 2, the resistor R1 may have a large resistance value, and the resistor R2 may have a smaller resistance value as compared to R1. For example, the resistor R1 may have a value of about 100 kilo-ohms, and the resistor R2 may have a value of about 15 kilo-ohms. In other examples, the resistors R1, R2 may have other suitable resistance values such as more or less than 100 kilo-ohm, more or less than 15 kilo-ohms, etc.

Figure 3:
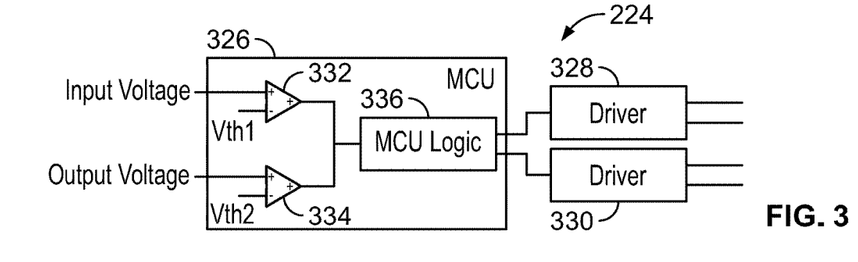
FIG. 3 is a block diagram of a portion of the control circuit of FIG. 2.

As shown in FIG. 2, the control circuit 210 includes a controller 224 and an opto-coupler U1. The controller 224 may include various components for controlling the MOSFET Q1 and the relay K1 based on the sensed input voltage from the voltage sensor 212 and the sensed output voltage from the voltage sensor 214. FIG. 3 illustrates one example of the controller 224 of FIG. 2.

For example, and as shown in FIG. 3, the controller 224 includes a microcontroller (MCU) 326, and drivers 328, 330. The MCU 326 includes comparators 332, 334 and logic components 336. During operation, the controller 224 receives the sensed input voltage from the voltage sensor 212 and the sensed output voltage from the voltage sensor 214. In some examples, the MCU 326 and/or the sensors 212, 214 may include one or more analog-to-digital converters (not shown) to convert the sensed input voltage and/or the sensed output voltage into digital signals. The comparator 332 compares the sensed input voltage with a defined threshold Vth1, and the comparator 334 compares the sensed output voltage with a defined threshold Vth2. The logic components 336 receive the resulting comparisons from the comparators 332, 334, and generate signals for the drivers 328, 330 to drive the MOSFET Q1 (via the opto-coupler U1) and the relay K1. The values of the defined thresholds Vth1, Vths of FIG. 3 may be similar to the values of the defined thresholds of FIG. 1.

In other examples, the control circuit 210 may include other suitable components for controlling the MOSFET Q1 and the relay K1. For example, the opto-coupler U1 may be replaced with a magnetically coupled switching device such as a relay.

In the example of FIGS. 2 and 3, the control circuit 210 is powered by a supply voltage. This supply voltage may be provided by the input power source, and/or from an auxiliary supply. In such examples, the supply voltage may also provide power for driving the relay K1 if desired.

Figure 4:
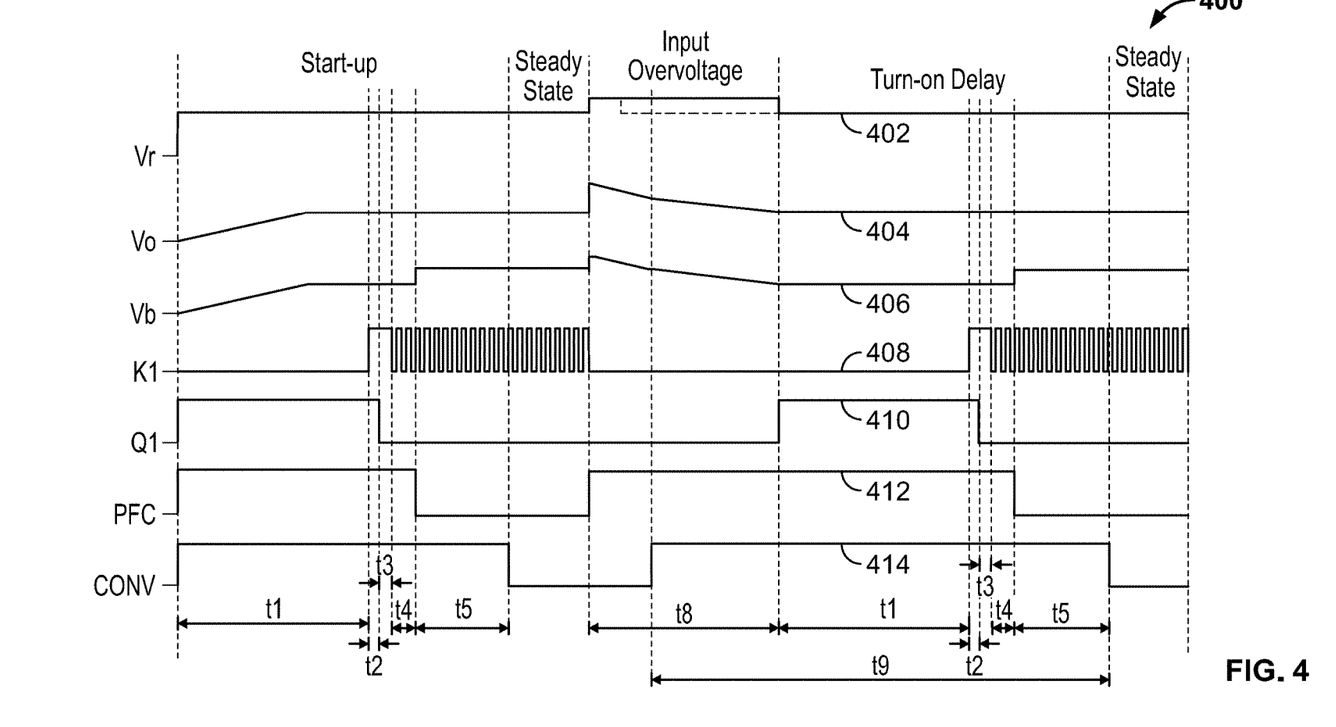
FIG. 4 is a timing diagram including waveforms of different parameters from the power supply of FIG. 2.

The control circuit 210 may function in a similar manner as the control circuit 110 of FIG. 1. For example, FIG. 4 illustrates a timing diagram 400 including waveforms of different parameters from the power supply 200 of FIG. 2. Specifically, the waveform 402 represents a rectified input voltage Vr provided to the protection circuit 202, the waveform 404 represents an output voltage Vo of the protection circuit 202, the waveform 406 represents a bulk voltage Vb between the PFC circuit 220 and the DC/DC power conversion circuit 222, the waveform 408 represents the state of the relay K1, the waveform 410 represents the state of the MOSFET Q1, the waveform 412 represents a signal PFC for turning on/off the PFC circuit, and the waveform 414 represents a signal CONV for turning on/off the DC/DC power conversion circuit.

At startup, the input voltage Vr is at a rated peak voltage as shown by the waveform 402, the MOSFET Q1 is closed due to the input voltage providing a bias voltage to the MOSFET's gate terminal (as explained above), the relay K1 is open, and the opto-coupler U1 of the control circuit 210 is deactivated (e.g., turned off). As shown in FIG. 4, the signal PFC and the signal CONV are high indicating the PFC circuit and the DC/DC power conversion circuit are off. In such examples, current is passed through the protection circuit 202 via the MOSFET Q1 causing the output voltage Vo to rise as a capacitor C (e.g., representing the effective capacitance in the power converter 218) charges. During this time, the MOSFET Q1 may be operated in a PWM mode with a switching frequency between 100-120 Hz. In some examples, the MOSFET Q1 may be operated in its active mode to charge the capacitor C.

After a time period t1, the sensed voltage (proportional to the output voltage Vo) reaches the defined threshold Vth2. In response, the control circuit 210 generates a control signal to turn on (e.g., close) the relay K1 as shown by the waveform 408 transitioning to a high state. This provides a minimal series impedance path for the current passing through the protection circuit 202 to the power converter 218. In some examples, the time period t1 may be about 6 seconds.

After the relay K1 is closed, the control circuit 210 activates the opto-coupler U1 to turn off (e.g., open) the MOSFET Q1 as shown by the waveform 410 transitioning to a low state. For example, when the opto-coupler U1 is on, current is pulled from the gate terminal of the MOSFET Q1 causing the MOSFET Q1 to turn off. During this time, the resistors R1, R2 set a minimum charging current when the MOSFET Q1 is off.

As shown in FIG. 4, a delay (e.g., a time period t2) may occur between closing the relay K1 and opening the MOSFET Q1. In some examples, the delay may be about 50 milliseconds.

After the MOSFET Q1 is off, the control circuit 210 may control the relay K1 in a PWM mode as shown by the waveform 408 repeatedly transitioning between a high state and a low state. This ensures the output voltage Vo remains at a constant level. As shown in FIG. 4, a delay (e.g., a time period t3) may occur between opening the MOSFET Q1 and entering the PWM mode. This delay may be about 450 milliseconds.

When the relay K1 is operating in its PWM mode, the signal PFC transitions to a low state to turn on the PFC circuit. This may occur a time period t4 (e.g., 500 milliseconds) after the relay K1 is operating in its PWM mode. Once the PFC circuit is enabled, the PFC output voltage Vb is regulated at, for example, a level higher than the peak AC input. This is shown in the waveform 406 at the end of time period t4.

After the PFC circuit is enabled, the signal CONV transitions to a low state to turn on the DC/DC power conversion circuit. In some examples, a delay (e.g., a time period t5) may occur between enabling the PFC circuit and enabling the DC/DC power conversion circuit. This ensures an output of the PFC circuit is sufficient for the DC/DC power conversion circuit. In some examples, the delay may be about 2 seconds. At this point, the power converter 218 may be in a steady state to provide an output voltage (e.g., a regulated output voltage) to the load.

At some point, the input voltage Vr may increase causing an overvoltage condition OV PLD as shown in FIG. 4 during a time period t8. This may cause the output voltage Vo and the PFC output voltage Vb to spike as shown in the waveforms 404, 406, and the signal PFC to transition to a high state to disable the PFC circuit. Later, the signal CONV transitions to a high state (e.g., after the PFC circuit's output decays) to disable the DC/DC power conversion circuit. This initiates an overvoltage recovery condition, as represented by a time period t9.

At the beginning of the time period t8, the control circuit 210 determines that the sensed input voltage has exceeded the defined threshold Vth1. In response, the control circuit 210 turns off (e.g., opens) the relay K1 as shown by the waveform 408 transitioning to a low state. At this time, the resistors R1, R2 provide the only current path between the power source 216 and the power converter 218. However, because the resistor R1 has a high resistance as explained above, a negligible amount of current passes through this path. As such, the power converter 218 is effectively disconnected from the power source 216 after the relay K1 is turned off. After the power converter 218 is disconnected, the capacitor C discharges causing the output voltage Vo (waveform 404) and the PFC output voltage Vb (waveform 406) to decrease.

Once the input voltage decreases Vr, the power supply 200 may enter a turn on delay period TON DELAY as shown in FIG. 4. During this time, the power converter 218 is reconnected to the power source 216 via the MOSFET Q1. For example, in response to the input voltage falling below the defined threshold Vth1, the control circuit 210 may turn off the opto-coupler U1. As a result, the MOSFET Q1 is turned back on due to a bias voltage from the input voltage to charge (or recharge) the capacitor C, as explained above. After which, the previously explained steps may be repeated to bring the power converter 218 back to its steady state as explained above.

Figure 5:
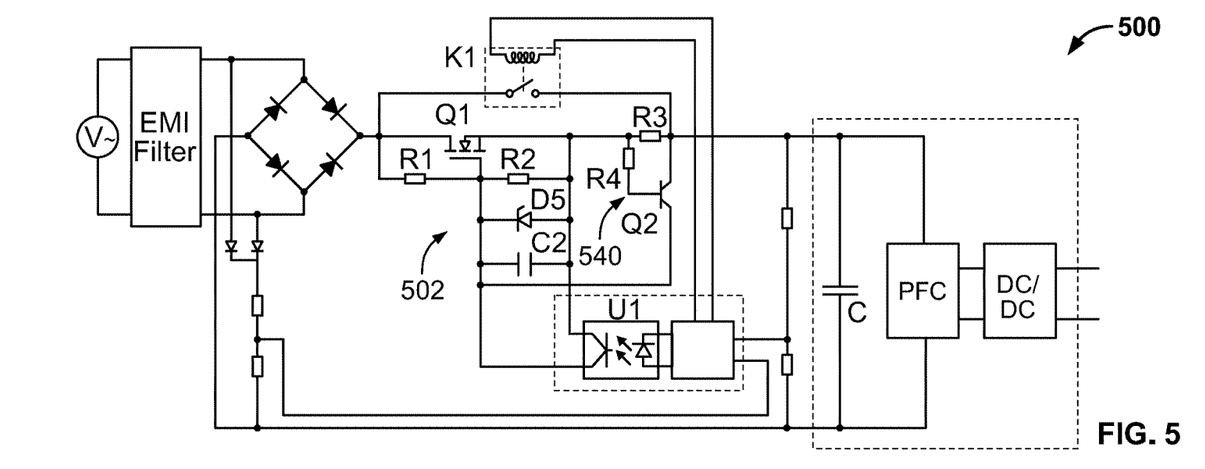
FIG. 5 is a schematic diagram of a power supply including a protection circuit having a switching device to limit inrush input current according to another example embodiment.

In some examples, the protection circuits disclosed herein may include current limiting functionality. In such examples, the protection circuits may include a circuit for limiting inrush current from the input power source. For example, FIG. 5 illustrates a power supply 500 substantially similar to the power supply 200, but including an inrush current limiting circuit 540. The power supply 500 of FIG. 5 includes a protection circuit 502 having the inrush current limiting circuit 540 coupled to the MOSFET Q1. Specifically, and as shown in FIG. 5, the inrush current limiting circuit 540 is coupled between the MOSFET Q1 and the power converter 218. As such, when the input voltage is present, the current limiting circuit 540 may limit input current to ensure a controlled amount of current passes through the MOSFET Q1 to the power converter 218.

As shown in FIG. 5, the inrush current limiting circuit 540 includes a resistor R3 and a transistor Q2. The resistor R3 is coupled between the MOSFET Q1 and the transistor Q2. Specifically, one end of the resistor R3 is coupled to the source terminal of the MOSFET Q1 and a base terminal of the transistor Q2 (via a resistor R4), and the other end of the resistor R3 is coupled to an emitter terminal of the transistor Q2. A collector terminal of the transistor Q2 is coupled to the gate terminal of the MOSFET Q1.

When operated, the limiting circuit 540 controls the amount of the current passing through the protection circuit 502. For example, if the input current increases, a voltage drop across the resistor R3 increases. Once the voltage drop across the resistor R3 reaches the base-emitter voltage Vbe of the transistor Q2, the transistor Q2 turns on (and operates in its active mode). As a result, some of the current applied to the gate terminal of the MOSFET Q1 is passed through the transistor Q2. This causes a reduction in the gate-source voltage Vgs of the MOSFET Q1 thereby reducing the conductivity of the MOSFET Q1 and limiting the current passing through the MOSFET Q1. As such, the input current flowing through the MOSFET Q1 (and provided to the power converter 218) may be limited to a fixed value determined by the resistor R3 and the transistor Q2.

The resistor R3 may be any suitable value for creating a voltage drop to limit current through the MOSFET Q1. In some examples, the value of the resistor R3 may be low such as less than about 5 ohms. In other examples, the value may be higher if desired.

As shown in FIG. 5, the protection circuit 502 further includes the resistor R4 coupled to the transistor Q2. Specifically, one end of the resistor R4 is coupled to the base terminal of the transistor Q2, and the other end of the resistor R4 is coupled to the resistor R3 and the source terminal of the MOSFET Q1. During operation, the resistor R4 limits the base voltage on the transistor Q2 so it does not exceed a set base-emitter voltage Vbe rating.

Figure 6:
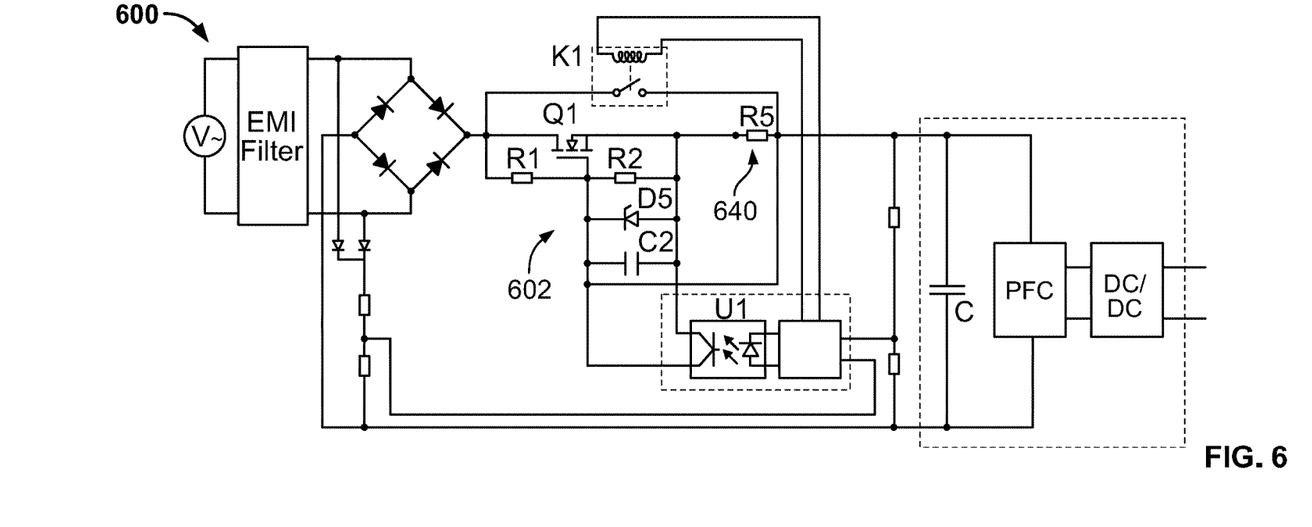
FIG. 6 is a schematic diagram of a power supply including a protection circuit having a resistor to limit inrush input current according to yet another example embodiment.

In other examples, the protection circuits may have another suitable inrush current limiting circuit. For example, FIG. 6 illustrates a power supply 600 substantially similar to the power supply 500, but including a different inrush current limiting circuit. In the example of FIG. 6, the power supply 600 includes a protection circuit 602 having an inrush current limiting circuit 640 coupled on the MOSFET Q1. Specifically, the inrush current limiting circuit 640 includes a resistor R5 coupled between the MOSFET Q1 and the power converter 218 for limiting input current to ensure a controlled amount of current passes through the MOSFET Q1.

In the particular example of FIG. 6, the MOSFET Q1 may be operated in a switch mode. As such, if the input current increases, a voltage drop across the resistor R5 increases. This voltage drop may decrease the gate-source voltage Vgs of the MOSFET Q1 thereby limiting the current passing through the MOSFET Q1, as explained above.

Figure 7:
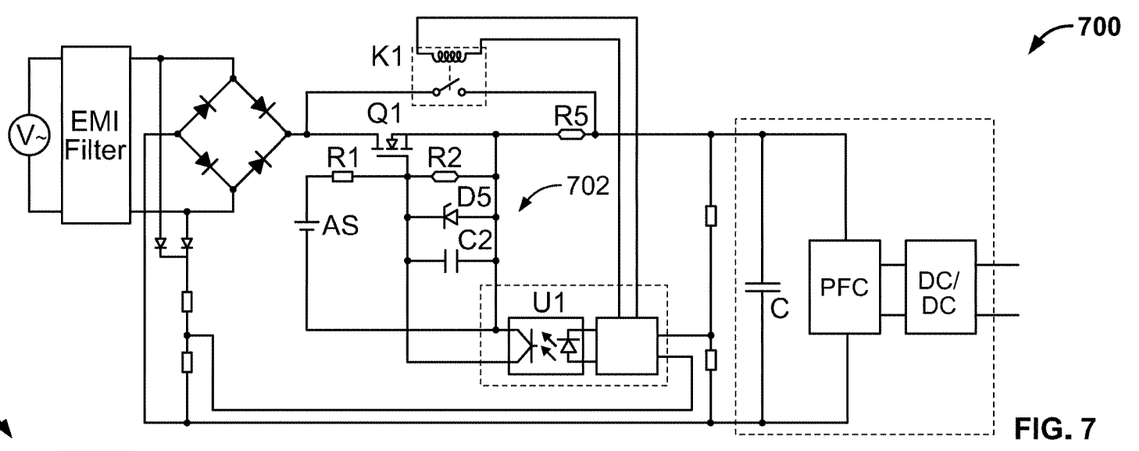
FIG. 7 is a schematic diagram of a power supply including a protection circuit having a switching device controlled with an auxiliary source according to another example embodiment.

FIG. 7 illustrates a power supply 700 substantially similar to the power supply 600, but where the MOSFET Q1 is controlled to turn on based on an auxiliary supply. Specifically, and as shown in FIG. 7, the power supply 700 includes a protection circuit 702 having an auxiliary supply AS coupled to the gate terminal of the MOSFET Q1 for providing a bias voltage to the MOSFET Q1. More particularly, the auxiliary supply AS is coupled between the resistor R1 and the opto-coupler U1.

During operation, the MOSFET Q1 may turn on based on a bias voltage applied by the auxiliary supply AS. For example, once an input voltage is sensed, the control circuit 210 may activate the opto-coupler U1. As a result, the auxiliary supply AS provides the bias voltage to the gate terminal of the MOSFET Q1 via the voltage divider (formed by the resistors R1, R2) as explained above.

Figure 8:
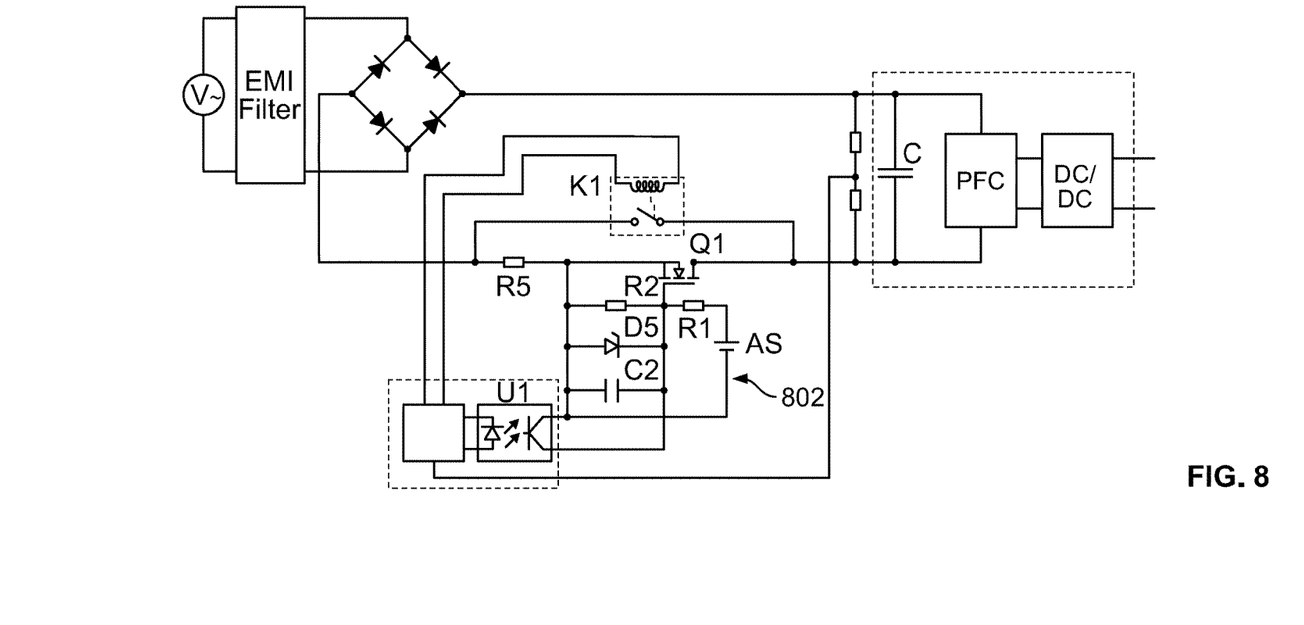
FIG. 8 is a schematic diagram of a power supply including a power source, a power converter, and a protection circuit coupled in a low side rail between the power source and the power converter according to yet another example embodiment.

As shown in the examples of FIGS. 1, 2 and 5-7, the protection circuits 100, 202, 502, 602, 702 are coupled in a high side rail (e.g., a positive rail, a supply rail, etc.) between the power sources and the power converters. In other examples, any one of the protection circuits disclosed herein may be coupled in a low side rail (e.g., a reference rail, a return rail, etc.). For example, FIG. 8 illustrates a power supply 800 substantially similar to the power supply 700, but having a protection circuit 802 coupled in a low side rail between the power source 216 and the power converter 218.

In some examples, the protection circuits disclosed herein may include additional optional circuitry. For example, and as shown in FIGS. 5-8, the protection circuits 502, 602, 702, 802 each include a voltage regulating circuit to protect the MOSFET Q1. Specifically, and as shown in FIGS. 5-8, the protection circuits 502, 602, 702, 802 each include a diode (e.g., a zener diode) D5 and a capacitor C2 coupled in parallel with the diode D5. The diode D5 and the capacitor C2 are coupled between the gate and source terminals of the MOSFET Q1. In operation, the combination of the diode D5 and the capacitor C2 limits (e.g., clamps) the gate-source voltage Vgs of the MOSFET Q1.

Additionally, the power supplies disclosed herein may include additional optional circuitry. For example, and as shown in FIGS. 2 and 5-8, the power supplies 200, 500, 600, 700, 800 each include an electromagnetic interference (EMI) filter and a rectifying circuit coupled between the AC power source 216 and the protection circuit 202, 502, 602, 702, 802. In the particular examples of FIGS. 2 and 5-8, the rectifying circuit is shown as a diode bridge. In other examples, another suitable rectifying circuit may be employed if desired. Additionally, although the power supplies 200, 500, 600, 700, 800 include the EMI filter and the rectifying circuit, it should be apparent to those skilled in the art that either component may be removed, moved to another suitable location such as on the output side of the protection circuits, etc.

The sensors disclosed herein may be any suitable sensing device. For example, the sensors may be a resistive voltage sensor formed with a voltage divider as shown in FIGS. 2 and 5-8. In other examples, another suitable voltage sensing device may be employed. Additionally and/or alternatively, the sensors may sense a parameter other than an input and/or output voltage. In such examples, the parameter may be used to determine (e.g., calculate, estimate, etc.) the input and/or output voltage.

Additionally, and as shown in FIGS. 2 and 5-8, the input voltage sensors are coupled to sense an AC input voltage. In other examples, the input voltage sensors of FIGS. 2 and 5-8 may be coupled in another suitable location to sense the input voltage. For example, the input voltage sensors may be coupled on the output side of the rectifying circuit to sense a rectified AC input voltage if desired.

The switching devices disclosed herein may include any suitable active switching device. For example, in the particular examples of FIGS. 2 and 5-8, the protection circuits include the MOSFET Q1 coupled in a current path between their inputs and outputs, and the relay K1 coupled across the MOSFET Q1. In such examples, the MOSFET Q1 may be an N channel FET, and the relay K1 may be a normally open relay. In other examples, the MOSFET Q1 may be replaced with another suitable transistor such as an insulated-gate bipolar transistor (IGBT), and/or the relay K1 may be replaced with another suitable switching device if desired. In some examples, the switching devices may be selected based on safe operating area (SOA) performances to ensure the switching devices may be safely operated.

The power sources disclosed herein may include any suitable power source. For example, the power sources may include an AC power source as shown in FIGS. 2 and 5-8. In such examples, the AC power source may include a power grid, a generator, etc. In other examples, the power sources may include a DC power source such as one or more batteries (e.g., rechargeable batteries), etc.

Figure 9:
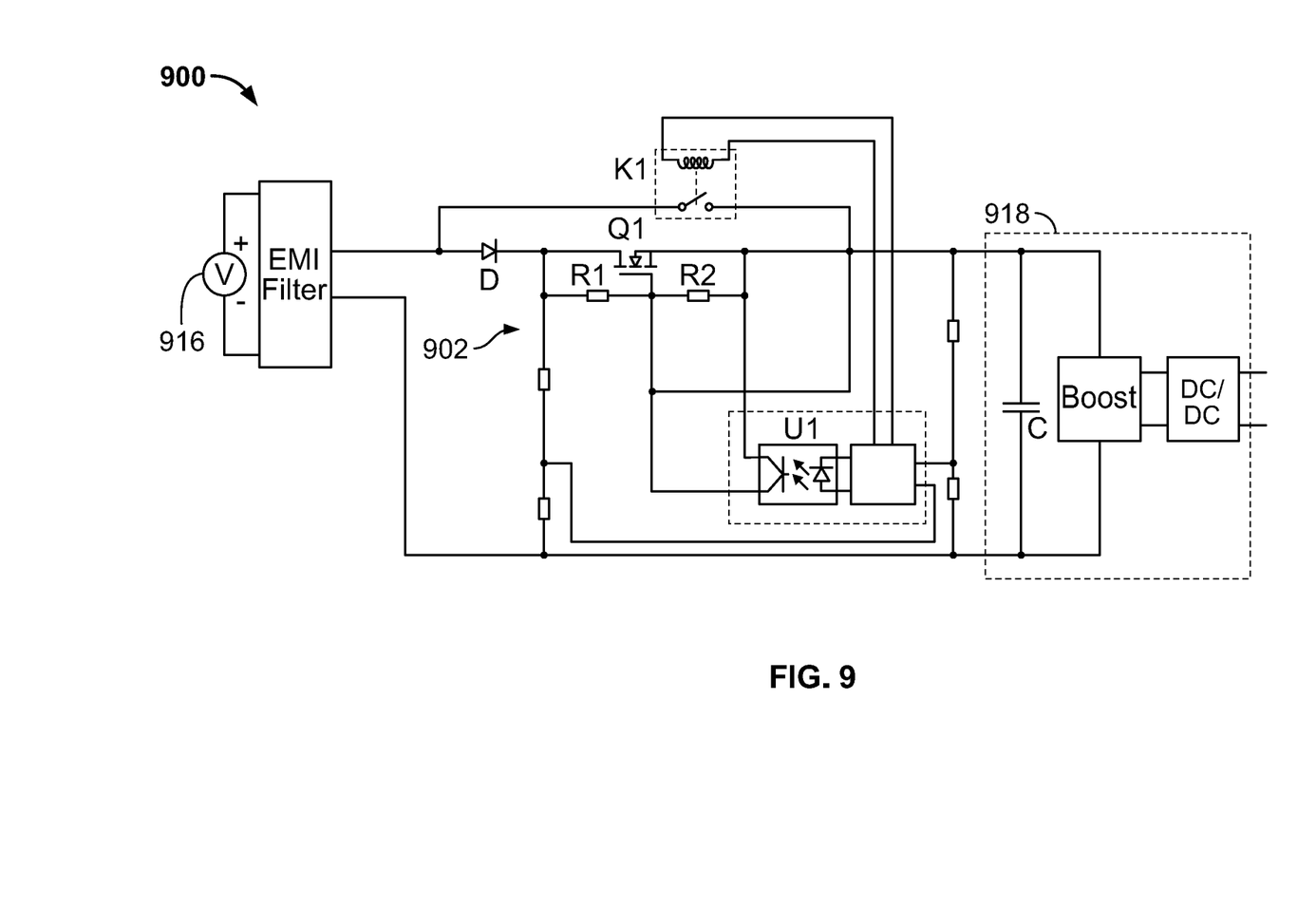
FIG. 9 is a schematic diagram of a power supply including a DC power source, a DC/DC power converter, and a protection circuit for disconnecting the DC power source from the DC/DC power converter according to another example embodiment.

The power converters disclosed herein may include any suitable power converting circuitry. For example, the power converters may include an AC/DC power converter such as an AC/DC PFC circuit and a DC/DC power conversion circuit as shown in FIGS. 2 and 5-8. In other examples, the power converters may include a DC/DC power converter. For example, FIG. 9 illustrates a power supply 900 substantially similar to the power supply 200, but having a protection circuit 902 coupled between a DC power source 916 and a DC/DC power converter 918. In such examples, the protection circuit 902 includes a diode D coupled between the MOSFET Q1 and the DC power source 916 to provide reverse current protection. As shown, the DC/DC power converter 918 may include a boost converter and a DC/DC power conversion circuit.

The protection circuit 902 of FIG. 9 may include any one or more of the optional features explained herein. For example, although not shown, the protection circuit 902 may include circuitry for limiting inrush current such as the example circuitry shown in FIGS. 5 and 6. Additionally, the MOSFET Q1 may be self-biased in response to an input voltage from the power source 916 (as shown in FIG. 9), and/or controlled to turn on based on an auxiliary supply as shown in FIG. 7. Further, the protection circuit 902 may be coupled in a high side rail (as shown in FIG. 9), or a low side rail as explained herein.

Additionally, the power converters may include any suitable power conversion topology having one or more power switching devices. For example, the power converters may include one or more of a buck topology, a boost topology, a buck-boost topology, a forward topology, a flyback topology, a half bridge topology, a full bridge topology, and/or their resonant counterparts.

The control circuits disclosed herein may include an analog control circuit, a digital control circuit, or a hybrid control circuit (e.g., a digital control unit and an analog circuit). The digital control circuits may be implemented with one or more types of digital control circuitry. For example, the digital control circuits each may include a digital signal controller (DSC), a digital signal processor (DSP), a MCU, a field-programmable gate array (FPGA), an application-specific IC (ASIC), etc. In some examples, the control circuits may be used for controlling the switching devices of the protection circuits and at least portions of the power converters coupled to the protection circuits. For example, in the particular example of FIG. 4, the control circuit 210 includes the MCU 326 for controlling the MOSFET Q1 and the relay K1. In some examples, the MCU 326 may also control portions of the PFC circuit if desired.

If, for example, the control circuit is a digital control circuit, the control circuit may be implemented with one or more hardware components and/or software. For example, instructions for performing any one or more of the features disclosed herein may be stored in and/or transferred from a non-transitory computer readable medium, etc. to one or more existing digital control circuits, new digital control circuits, etc. In such examples, one or more of the instructions may be stored in volatile memory, nonvolatile memory, ROM, RAM, one or more hard disks, magnetic disk drives, optical disk drives, removable memory, non-removable memory, magnetic tape cassettes, flash memory cards, CD-ROM, DVDs, cloud storage, etc.

The power supplies disclosed herein may be employed in any various applications. For example, the power supplies may be useful in outdoor power supply applications requiring excessive overvoltage protection such as at least 150% of the rated input voltage, high efficiency power supply applications, power supply applications including high-density conduction cooled systems, etc. In some examples, the power supplies may receive an AC input voltage ranging between 85 VAC and 275 VAC.

The protection circuits disclosed herein provide a compact and efficient approach with precise timing control to protect components (e.g., MOSFETs, diodes, capacitors, etc.) in the power converters. For example, and as explained herein, the protection circuits may provide protection during input overvoltage conditions by disconnecting the power converters from the input power sources, during excess input current conditions by precisely controlling inrush input current to limit the amount of current passed to the power converters, etc. Additionally, the protection circuits may provide the overvoltage and/or inrush current protection with significantly reduced losses and increased efficiency as compared to conventional approaches. Further, the protection circuits may be implemented with relative ease, require less board space, and require less complicated thermal management solutions in high density power supply applications as compared to conventional approaches including multiple relays.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. An electrical power supply comprising:
a power converter;
a protection circuit including an input coupled to an electrical power source for receiving an input voltage, an output coupled to the power converter for providing an output voltage to the power converter, a first transistor coupled in a current path between the input and the output, the first transistor controllable to turn on during startup of the power converter, a relay coupled across the first transistor, and a second transistor coupled to the first transistor and configured to limit current passing through the first transistor; and
a control circuit in communication with the first transistor and the relay, the control circuit configured to sense the input voltage and the output voltage, in response to the output voltage exceeding a first defined threshold, control the first transistor to turn off and the relay to turn on to supply power to the power converter, and in response to the input voltage exceeding a second defined threshold, control the relay to turn off to disconnect the electrical power source from the power converter.

2. The electrical power supply of claim 1 wherein the first transistor is a self-biasing MOSFET configured to turn on in response to the input voltage.

3. The electrical power supply of claim 2 wherein the input voltage is an AC input voltage, wherein the first defined threshold is a rated peak voltage of the AC input voltage, and wherein the second defined threshold is a voltage at least 120% of the rated peak voltage of the AC input voltage.

4. The electrical power supply of claim 3 wherein the control circuit is configured to turn off the relay to disconnect the electrical power source from the power converter in response to the input voltage exceeding the second defined threshold for a defined period of time.

5. The electrical power supply of claim 4 wherein the defined period of time is based on the second defined threshold.

6. The electrical power supply of claim 1 wherein the control circuit is configured to control the first transistor to turn on during startup of the power converter.

7. An electrical power supply comprising:

a power converter;

a protection circuit including an input coupled to an electrical power source for receiving an input voltage, an output coupled to the power converter for providing an output voltage to the power converter, a first switching device coupled in a current path between the input and the output, the first switching device controllable to turn on during startup of the power converter, and a second switching device coupled across the first switching device; and a control circuit in communication with the first switching device and the second switching device, the control circuit configured to sense the input voltage and the output voltage, in response to the output voltage exceeding a first defined threshold, turn off the first switching device and turn on the second switching device to supply power to the power converter, and in response to the input voltage exceeding a second defined threshold, turn off the second switching device to disconnect the electrical power source from the power converter.

8. The electrical power supply of claim 7 wherein the first switching device is a self-biasing switching device configured to turn on in response to the input voltage.

9. The electrical power supply of claim 7 wherein the control circuit is configured to turn on the first switching device during startup of the power converter.

10. The electrical power supply of claim 7 wherein the first switching device is a MOSFET, and wherein the second switching device is a relay.

11. The electrical power supply of claim 7 wherein the input voltage is an AC input voltage, wherein the first defined threshold is a rated peak voltage of the AC input voltage, and wherein the second defined threshold is a voltage at least 120% of the rated peak voltage of the AC input voltage.

12. The electrical power supply of claim 7 wherein the control circuit is configured to turn off the second switching device to disconnect the electrical power source from the power converter in response to the input voltage exceeding the second defined threshold for a defined period of time.

13. The electrical power supply of claim 7 further comprising at least one of a resistance and a third switching device coupled to the first switching device to limit current passing through the first switching device.

14. The electrical power supply of claim 7 wherein the power converter includes a PFC circuit.

15. A protection circuit for coupling between an electrical power source and a power converter to provide input overvoltage protection for the power converter, the protection circuit comprising an input configured to couple to an electrical power source for receiving an input voltage, an output configured to couple to the power converter for providing an output voltage to the power converter, a first switching device coupled in a current path between the input and the output, the first switching device controllable to turn on during startup of the power converter, a second switching device coupled across the first switching device, and a control circuit in communication with the first switching device and the second switching device, the control circuit configured to sense the input voltage and the output voltage, in response to the output voltage exceeding a first defined threshold, turn off the first switching device and turn on the second switching device to supply power to the power converter, and in response to the input voltage exceeding a second defined threshold, turn off the second switching device to disconnect the electrical power source from the power converter.

16. The protection circuit of claim 15 wherein the first switching device is a self-biasing switching device configured to turn on in response to the input voltage.

17. The protection circuit of claim 16 wherein the first switching device is a MOSFET, and wherein the second switching device is a relay.

18. The protection circuit of claim 17 wherein the input voltage is an AC input voltage, wherein the first defined threshold is a rated peak voltage of the AC input voltage, and wherein the second defined threshold is a voltage at least 120% of the rated peak voltage of the AC input voltage.

19. The protection circuit of claim 18 wherein the control circuit is configured to turn off the second switching device to disconnect the electrical power source from the power converter in response to the input voltage exceeding the second defined threshold for a defined period of time.

20. The protection circuit of claim 15 further comprising at least one of a resistance and a third switching device coupled to the first switching device to limit current passing through the first switching device.

* * * * *